United States Patent

Choo et al.

(10) Patent No.: US 9,086,946 B2
(45) Date of Patent: Jul. 21, 2015

(54) POWERING AN INTERNAL MEMORY OF A COMPUTING DEVICE

(75) Inventors: Boon Siang Choo, Singapore (SG); Tzye Perng Poh, Shah Alam Selangor (MY); Leng Hoo Tan, Singapore (SG)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 365 days.

(21) Appl. No.: 13/454,565

(22) Filed: Apr. 24, 2012

(65) Prior Publication Data

US 2013/0282949 A1    Oct. 24, 2013

(51) Int. Cl.
 *G06F 13/36* (2006.01)
 *G06F 13/00* (2006.01)
 *G06F 13/40* (2006.01)
 *G06F 13/20* (2006.01)

(52) U.S. Cl.
 CPC ............... *G06F 13/00* (2013.01); *G06F 13/20* (2013.01); *G06F 13/4027* (2013.01)

(58) Field of Classification Search
 CPC .... G06F 3/0689; G06F 3/0635; G06F 3/0659
 USPC ............... 710/36–39, 306–317; 713/340
 See application file for complete search history.

(56) References Cited

U.S. PATENT DOCUMENTS

| 5,539,535 | A  | * | 7/1996  | Aizawa et al. ............... 358/468 |
| 6,735,671 | B1 |   | 5/2004  | Kida |
| 7,509,444 | B2 | * | 3/2009  | Chiu et al. ...................... 710/51 |
| 8,156,258 | B2 | * | 4/2012  | Kunikata ........................ 710/14 |
| 8,327,167 | B2 | * | 12/2012 | Bennett .......................... 713/300 |
| 2007/0033426 | A1 | * | 2/2007 | Wilson et al. ................. 713/324 |
| 2009/0292911 | A1 | * | 11/2009 | Chien ............................... 713/2 |

* cited by examiner

*Primary Examiner* — Raymond Phan
(74) *Attorney, Agent, or Firm* — Turocy & Watson, LLP

(57) ABSTRACT

A connection is established between a host device and an internal memory of a computing device. A voltage is received by the computing device from the host device. Upon receiving the regulated voltage, the internal memory of the computing device can exchange data with the host device.

22 Claims, 9 Drawing Sheets

POWERING AN INTERNAL MEMORY OF A COMPUTING DEVICE

BACKGROUND

Internal memory of a portable computing device can be accessed when the portable computing is able to power on and boot to an operating system. In the event the portable computing device is switched off, unable to be switched on, unable to boot to an operating system, etc., the internal memory generally cannot be accessed except by manually removing the internal memory and implementing it in a different computing device.

BRIEF DESCRIPTION OF THE DRAWINGS

Non-limiting and non-exhaustive implementations of the subject disclosure are described with reference to the following figures, wherein like reference numerals refer to like parts throughout the various views unless otherwise specified.

DETAILED DESCRIPTION

Figure 1:
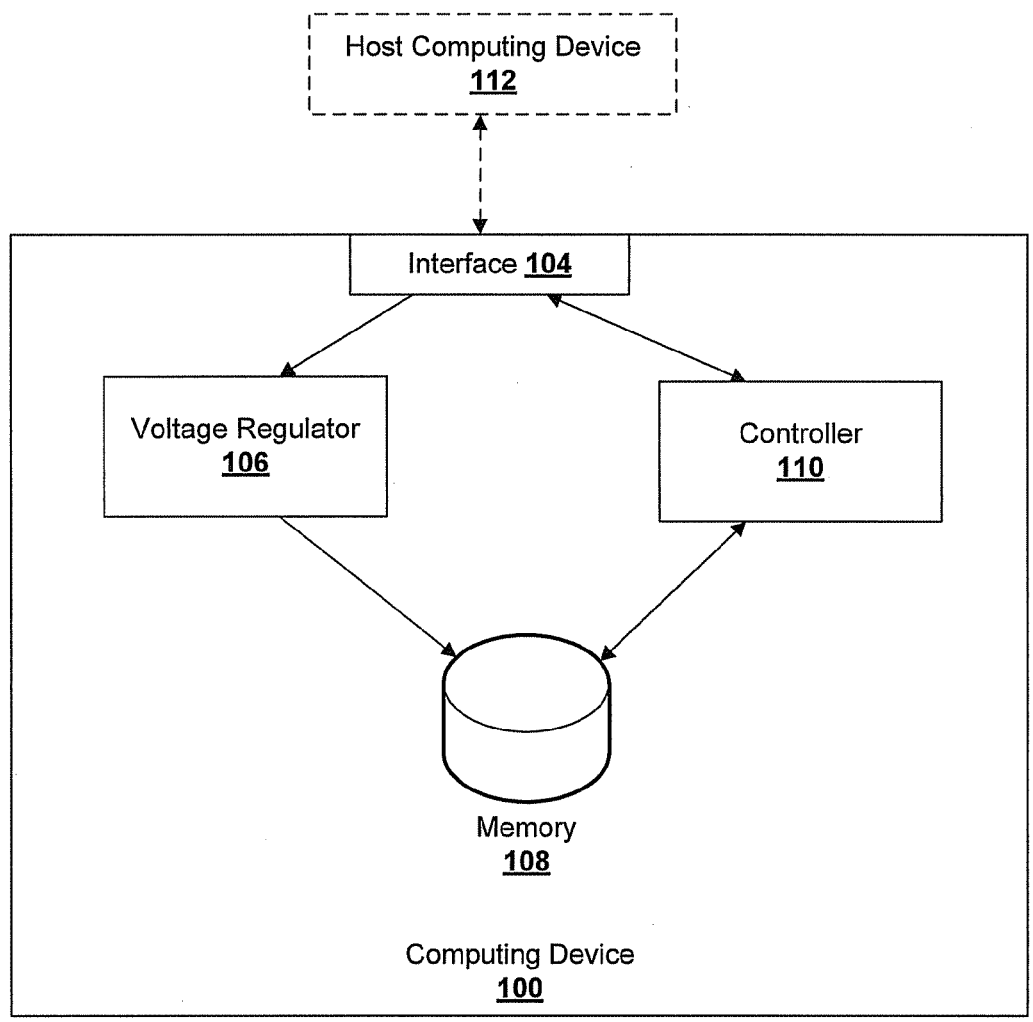
FIG. 1 is a schematic block diagram of a system that facilitates external access to an internal memory of a portable computing device, according to an implementation of the subject disclosure.

In the following description, numerous specific details are set forth to provide a thorough understanding of the subject disclosure. One skilled in the relevant art will recognize, however, that the examples described herein can be practiced without one or more of the specific details, or with one or more other methods, components, materials, etc. In other instances, well-known structures, materials, or operations are not shown or described in detail to avoid obscuring certain aspects.

According to an aspect of the subject disclosure, described herein is portable computing device with an internal memory that can exchange data with a host computing device, even when the portable computing device is inactive. The portable computing device includes an interface, which allows the host computing device to connect to the internal memory. The connection allows transmission of both voltage and data. The host device supplies voltage to the portable computing device, and the portable computing device regulates the voltage to a level sufficient to power on the internal memory. Upon powering on the internal memory, data can be exchanged between the internal memory and the host computing device.

When used herein, the term, "computing device" refers to any device with computing capability that is able to transmit or access data from any location. A computing device includes both portable computing devices and non-portable computing devices. A portable computing device is generally a device that can operate on a battery and transmit and receive data wirelessly. Examples of a portable computing device include: a laptop computer, a tablet computer, a personal digital assistant, a smart phone, and the like. A non-portable computing device is a desktop computer.

As described herein, the computing device can be "active" or "inactive." In other words, the computing state can be in an "active state" or an "inactive state." When used herein, the term, "active state" refers to an operational state of the computing device. The computing device is powered on and has booted to an operating system. When used herein, the term "inactive state" refers to a state where the computing device is powered off, unable to boot to an operating system, unable to power on, or otherwise unable to achieve the active state.

The computing device includes an internal memory. When used herein, the term "internal memory" refers to primary data storage that is directly available to a processor. The internal memory can be any type of non-volatile memory (e.g., ROM) or mass storage memory. Examples of internal memory include: a hard disk drive (HDD), a solid state drive (SSD), or the like.

The computing device can interface to a host computing device. When used herein, an "interface" refers to any point of interaction or communication between the computing device and the host computing device. Examples of an interface include: a universal serial bus (USB) interface, an IEEE 1394 interface, a wireless interface, or the like. A "host computing device" refers to any device that can interface with the computing device, such as, a laptop computer, a desktop computer, a wireless router, etc.

Referring now to FIG. 1 illustrated is a system that facilitates external access to an internal memory 108 of a computing device 100, according to an implementation of the subject disclosure. The computing device 100 includes an interface 104 that facilitates establishment of a connection between the internal memory 108 of the computing device 100 and a host computing device 112. The computing device 108 and the host computing device 112 can be connected through the interface 104 to exchange voltage and data.

The voltage received from the host device 112 is regulated by a voltage regulator 106 to a voltage sufficient to power up the internal memory 108 of the computing device 100. In other words, the voltage regulator 106 can convert voltage received from the host device 112 through the interface 104 to a voltage required by the internal memory 108 to power on.

The computing device also includes a controller 110. The controller 110 facilitates an exchange of data between the host computing device 112 and the internal memory 108 of the computing device. The controller 110 also includes an interface to the internal memory 108. The interface to the internal memory 108 can be a computer bus interface for connecting host bus adapters to mass storage devices, such as a serial advanced technology attachment, a parallel advanced technology attachment, or any other interface.

According to an aspect, the controller 110 can facilitate the exchange of the data between the internal memory 108 and the computing device 100 when the internal memory 108 is powered up through the voltage regulator 106. The controller 108 is any component that can allow access to the internal memory 108 of the computing device 100 to the host device 112 through the interface 104. To establish the exchange of data, the controller 110 can send a message through the interface to the host device 112 to facilitate mounting the internal memory 108 of the computing device to a file system of the host computing device 112.

When the internal memory 108 is mounted to the file system of the host computing device 112, the internal memory 108 can behave similarly to an external hard disk drive. Similarly to an external hard drive, when mounted to the file system of the host computing device 112, the internal memory 108 can exchange files with the host computing device 112 without booting to an operating system. The computing device 100 does not need to be powered on because the host computing device 112 provides a voltage that the voltage regulator 106 regulates o a regulated voltage sufficient to power on the internal memory 108 of the computing device 100. The internal memory 108 of the computing device 100 can exchange data with the host device 112 when the computing device 100 is in an inactive state. In other words, the internal memory 108 of the computing device 100 can exchange data with the host device 112 when the computing device 100 is in a switched off state, or is unable to enter a switched on state, is unable to boot to an operating system.

The ability to use the internal memory 108 of the computing device 100 similarly to an external hard disk drive is both time saving and data saving. Using the internal memory 108 of the computing device 100 similarly to an external hard disk drive can reduce or even eliminate the frustration of having to wait for the computing device 100 to fully boot up to copy a single file to the memory. If the computing device 100 fails, data can be recovered from the internal memory 108 by connecting to the host computing device 112 through the interface 104 without requiring the computing device 100 to turn on or boot to an operating system or the internal memory 108 of the computing device 100 to be removed from its casing.

Figure 2:
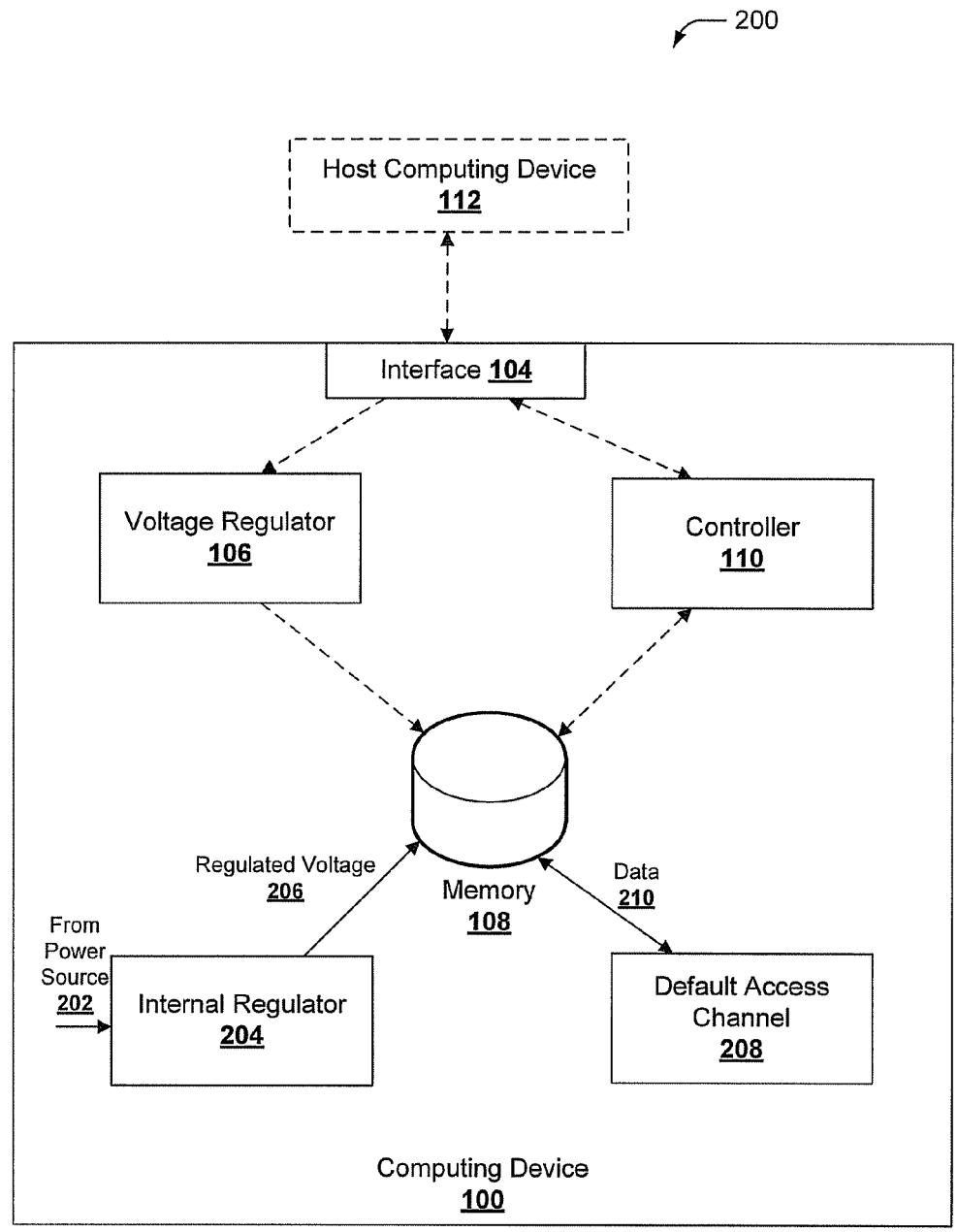
FIG. 2 is a schematic block diagram of a system that facilitates access to an internal memory of a portable computing device when power is detected from a default power source, according to an implementation of the subject disclosure.

Referring now to FIG. 2, illustrated is a system 200 that facilitates access to an internal memory 108 of a computing device 100 when power is detected from a default power source 202, according to an implementation of the subject disclosure. The default power source 202 can be a battery, an AC adapter, or any other power source native to the computing device 100.

When the computing device 100 is in an active state (or powered on), the internal memory 108 of the portable computing device 100 is accessed through a default memory access path. The default access path includes receiving a voltage from an internal power source 202. The voltage from the internal power source 202 is regulated to a voltage sufficient to power up the internal memory 108 of the portable computer 100 by an internal regulator 204. Data 210 is exchanged with the internal memory 108 of the portable computing system through a default access channel 208.

Figure 3:
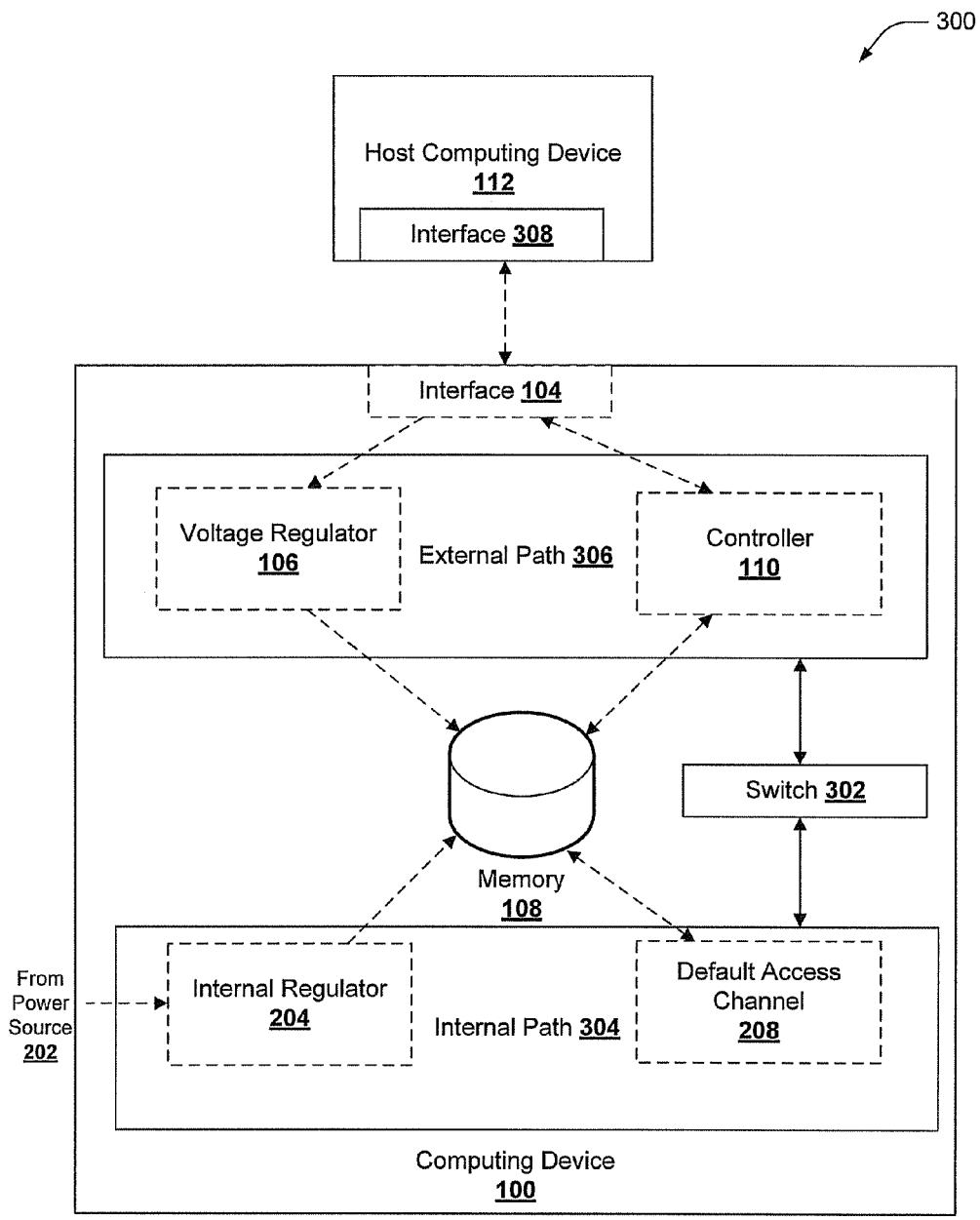
FIG. 3 is a schematic block diagram of a system that switches between an internal path and an external path for access to an internal memory of a portable computing device, according to an implementation of the subject disclosure.

FIG. 3 illustrates a system 300 that establishes data transfer between an internal memory 108 of a computing device 100 and an external host computing device 112, according to an implementation of the subject disclosure. The default access path, or internal path 304, is utilized when the computing device 100 is in the active state. The computing device 100 also includes an external access path (or external path 306). The external path 306 bypasses the internal access path when the computing device 100 is in the inactive state.

Computing device 100 includes a switch 302 that can facilitate switching between the internal path 304 and the external path 306. The switch 302 can include a logic circuit to determine when the computing device 100 is in the active state or the inactive state and a multiplexer to set the path of operation based on the state.

When the computing device 100 is determined by the logic circuit to be in the active state, the multiplexer of switch 302 defaults to point to the internal path 304. When the computing device 100 is determined to be in the inactive state by the logic circuit of the switch 302, the multiplexer of the switch 302 switches pointing from the internal path 304 to the external path 306. Depending on the direction the switch 302 is pointed, the host receives different identification messages from the computing device 100. When the computing device 100 is in the active state, the host receives an identification message that a computing device is connected. When the computing device 100 is in the inactive state, the host receives an identification message that an external hard drive is connected.

Figure 4:
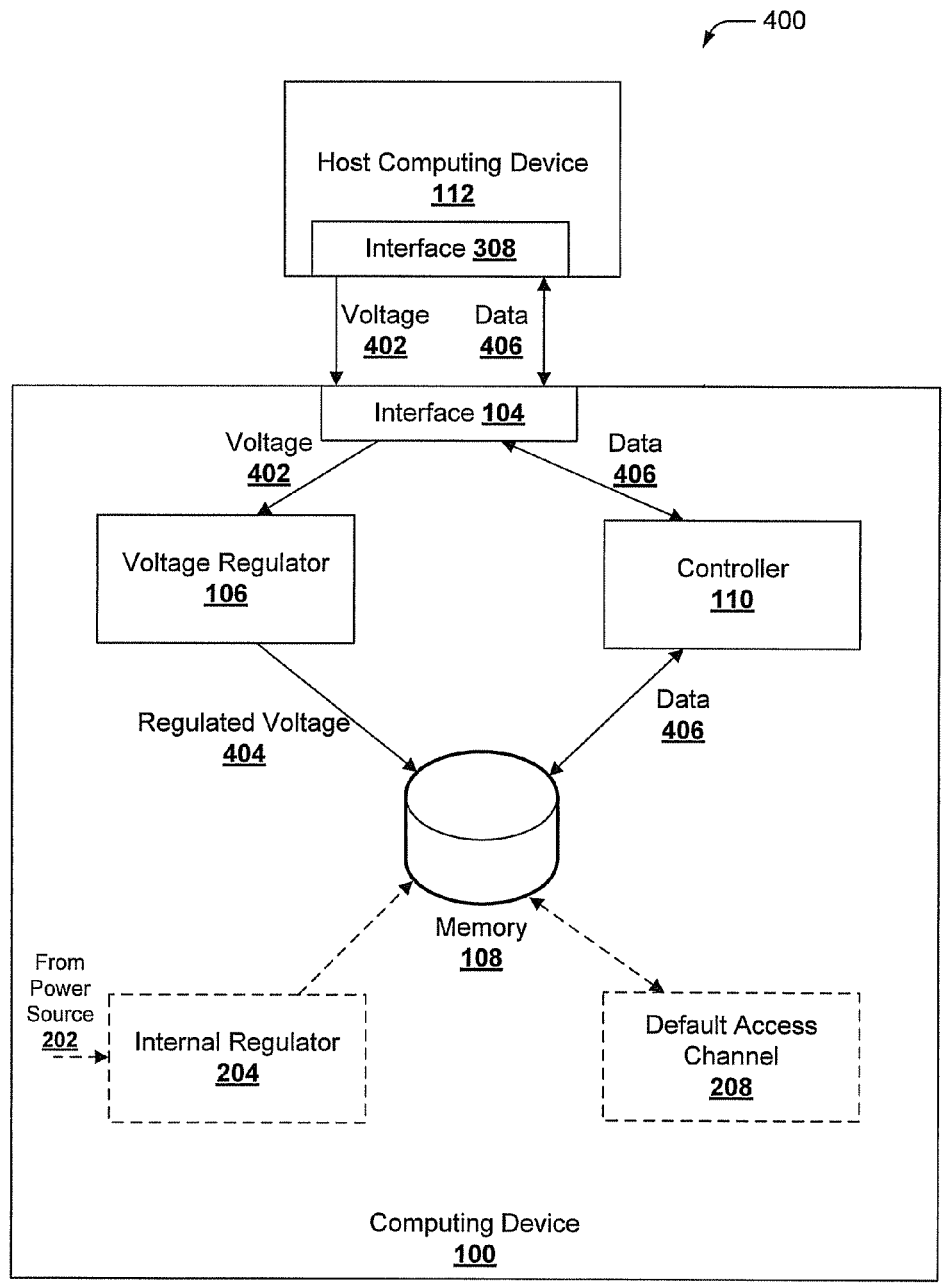
FIG. 4 is a schematic block diagram of a system that establishes data transfer between an internal memory of a portable computing device and an external host, according to an implementation of the subject disclosure.

The external path 306 enables transfer of data between the internal memory 108 of the computing device 100 and an external host 123. Referring now to FIG. 4, illustrated is a system 400 that establishes data transfer between the internal memory 108 of the computing device 100 and the external host 112, according to an implementation of the subject disclosure.

The computing device 100 and the host computing device 112 have compatible interfaces 104 and 308. Through interfaces 104 and 308, a connection is established between the internal memory 108 of the computing device 100 and the host computing device 112. Through the connection, the internal memory 108 of the portable computing device 100 and the host computing device 112 can exchange data 406. The exchange of data 406 can be bilateral. In other words, data 406 can be transmitted between the internal memory 108 of the portable computing device 100 and the host computing device 112. Data 406 can be received at the internal memory 108 of the portable computer device 100 from the host computing device 112. The exchange of data 406 is facilitated by controller 110.

Interfaces 104 and 308 also enable the host computing device 112 to supply a voltage 402 to the internal memory 108 of the portable computing device 100. The voltage 402 received from the host device 112 is regulated by a voltage regulator 106 to a regulated voltage 404. The regulated voltage 404 is generally a voltage sufficient to power up the internal memory 108 of the portable computing device 100.

Figure 5:
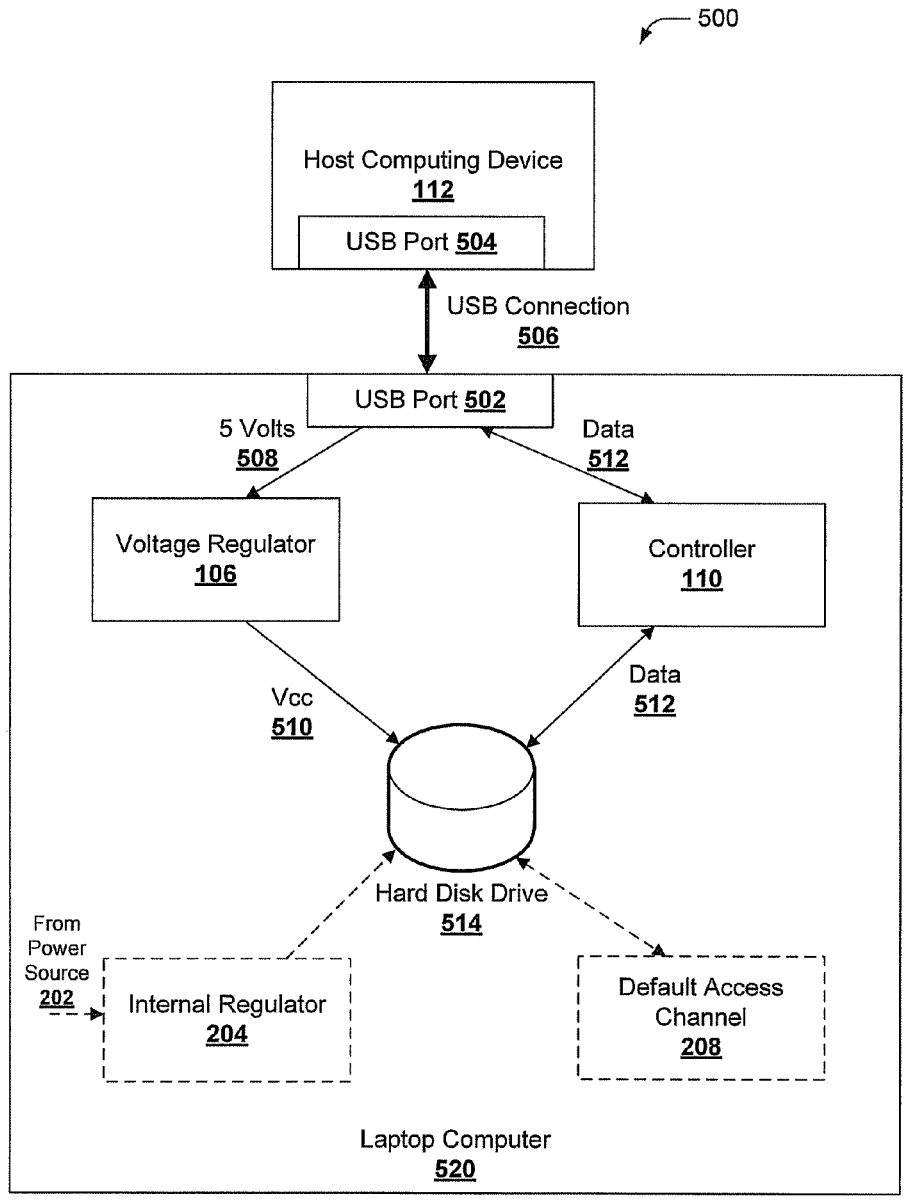
FIG. 5 is a schematic block diagram of an example system that facilitates exchange of data between internal memory of a laptop computer and an external host computing device, according to an implementation of the subject disclosure.

Referring now to FIG. 5, illustrated is an example system 500 that facilitates exchange of data between internal hard disk drive 514 of a laptop computer 520 and an external host computing device 112, according to an implementation of the subject disclosure. The host computing device 112 has a USB port 504. The laptop computer 520 also has a USB port 502. A USB connection 506 can be established between the USB port 504 on the host device 112 and the USB port 502 of the laptop computer 502. The USB port 502 of the laptop computer switches between a normal USB port on the computer and a USB port that connects to the hard disk drive if the computer is not powered on.

The host computing device 112 can send a voltage of 5 Volts 508 through the USB connection 506 to the laptop computer 506. The voltage regulator 106 regulates the 5 Volts 508 to Vcc 510, or the voltage sufficient to power up the internal hard disk drive 514 of the laptop computer 520.

When the internal hard disk drive 514 powers up, data 512 can be exchanged between the internal hard disk drive 514 and the host computing device 112 through the USB connection 506. The transfer of data 512 is regulated by the controller 110. The controller 110 facilitates the docking of the internal hard disk drive 514 to the file system of the host computing device 112. After the docking, data 512 can easily be exchanged between the hard disk drive 514 and the host computing device.

FIGS. 6, 7, 8, and 9 show methods illustrated as flow diagrams. For simplicity of explanation, the methods are depicted and described as series of acts. However, the methods are not limited by the acts illustrated and by the order of acts. For example, acts can occur in various orders and/or concurrently, and with other acts not presented and described herein. Furthermore, not all illustrated acts may be required to implement the methods. Additionally, it should be further appreciated that the methods can be implemented on an article of manufacture (e.g., a non-transitory computer-readable storage medium) to facilitate transporting and transferring the methods.

Figure 6:
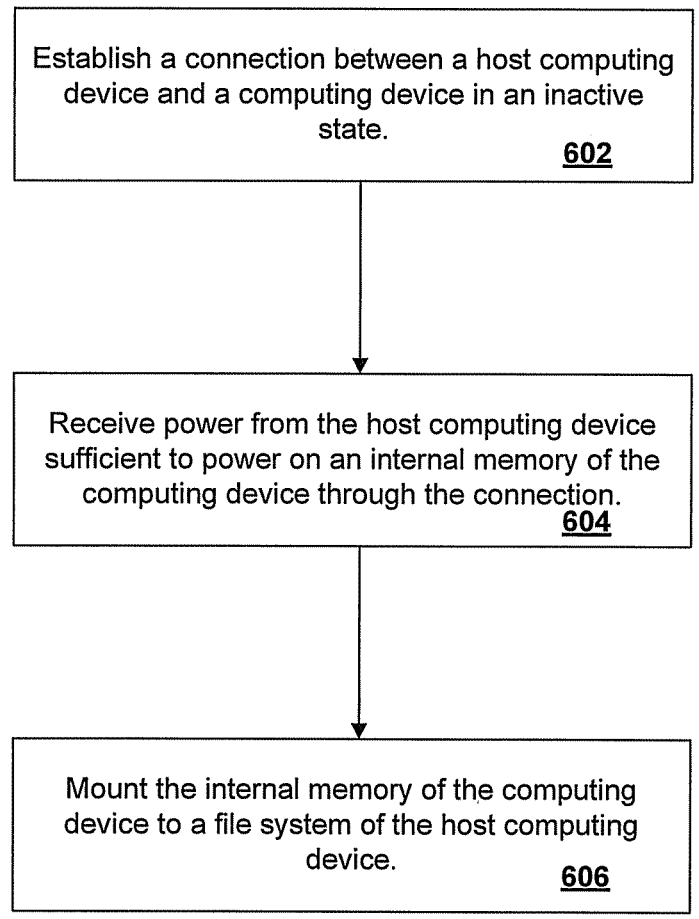
FIG. 6 is a schematic process flow diagram of a method for establishing a connection between an internal memory of a portable computing device and a host computing device, according to an implementation of the subject disclosure.

Referring now to FIG. 6, illustrated is a method 600 for establishing a connection between an internal memory of a portable computing device and a host computing device, according to an implementation of the subject disclosure. At element 602, a connection is established between a host computing device and a portable computing device in an inactive state. At element 604, the computing device receives power from the host computing device sufficient to power on an internal memory of the computing device through the connection. At element 606, the internal memory of the computing device is mounted to a file system of the host computing device through the connection.

By mounting the internal memory of the computing device to the file system of the host computing device, the internal memory of the computing device can act similarly to an external hard drive. In other words, the host computing device can interact with the internal hard drive of the computing device in a similar way as the host computing device would interact with an external hard drive or other external memory source.

Figure 7:
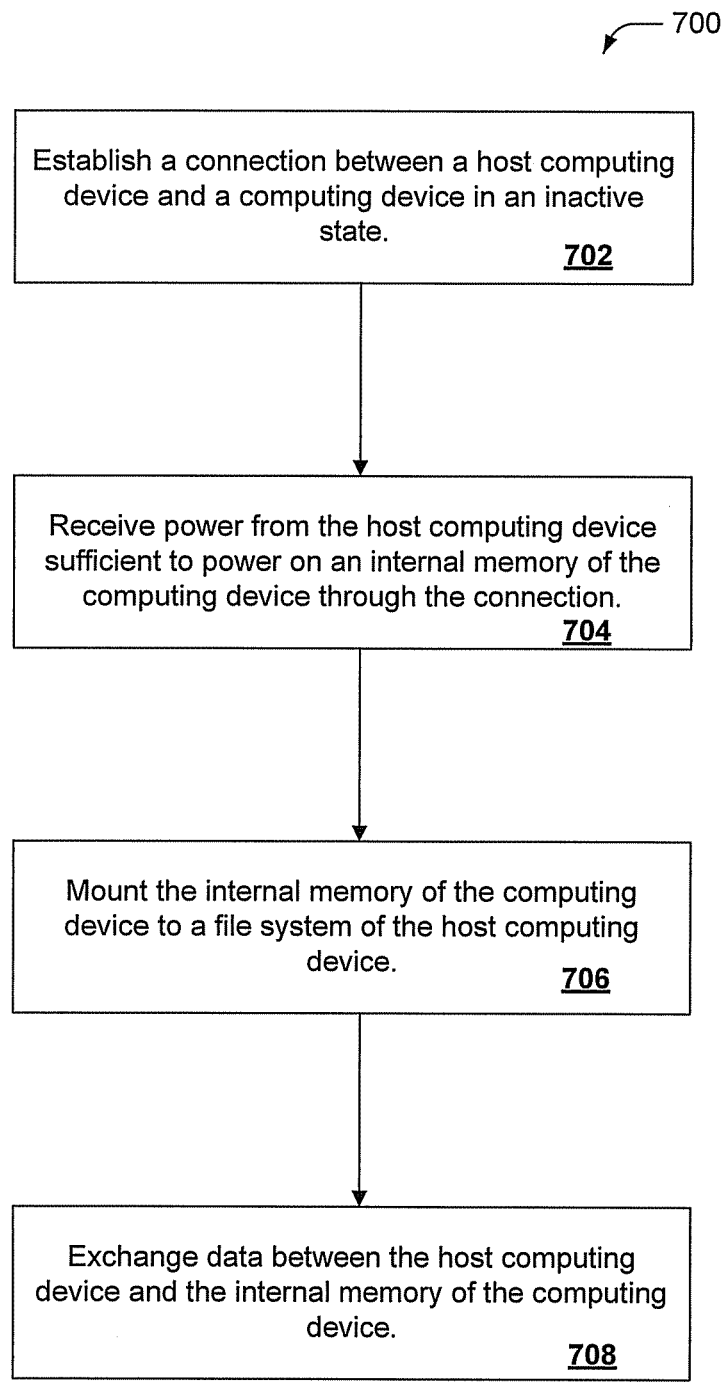
FIG. 7 is a schematic process flow diagram of a method for exchanging data between an internal memory of a portable computing device and a host computing device, according to an implementation of the subject disclosure.

Referring now to FIG. 7, illustrated is a method 700 for exchanging data between an internal memory of a computing device and a host computing device, according to an implementation of the subject disclosure. At element 702, a connection is established between a host computing device and a computing device in an inactive state. At element 704, power is received from the host computing device sufficient to power on an internal memory of the computing device through the connection. At element 706. The internal memory of the host computing device is mounted to a file system of the host computing device. At element 708, data is exchanged between the host computing device and the internal memory of the computing device through the connection.

The connection can allow both voltage transfer and data transfer. The voltage transfer can be unilateral from the host computing device to the computing device. The data transfer can be bilateral between the host computing device and the internal memory of the computing device. The data transfer can be completed without requiring the computing device to enter the active state.

Figure 8:
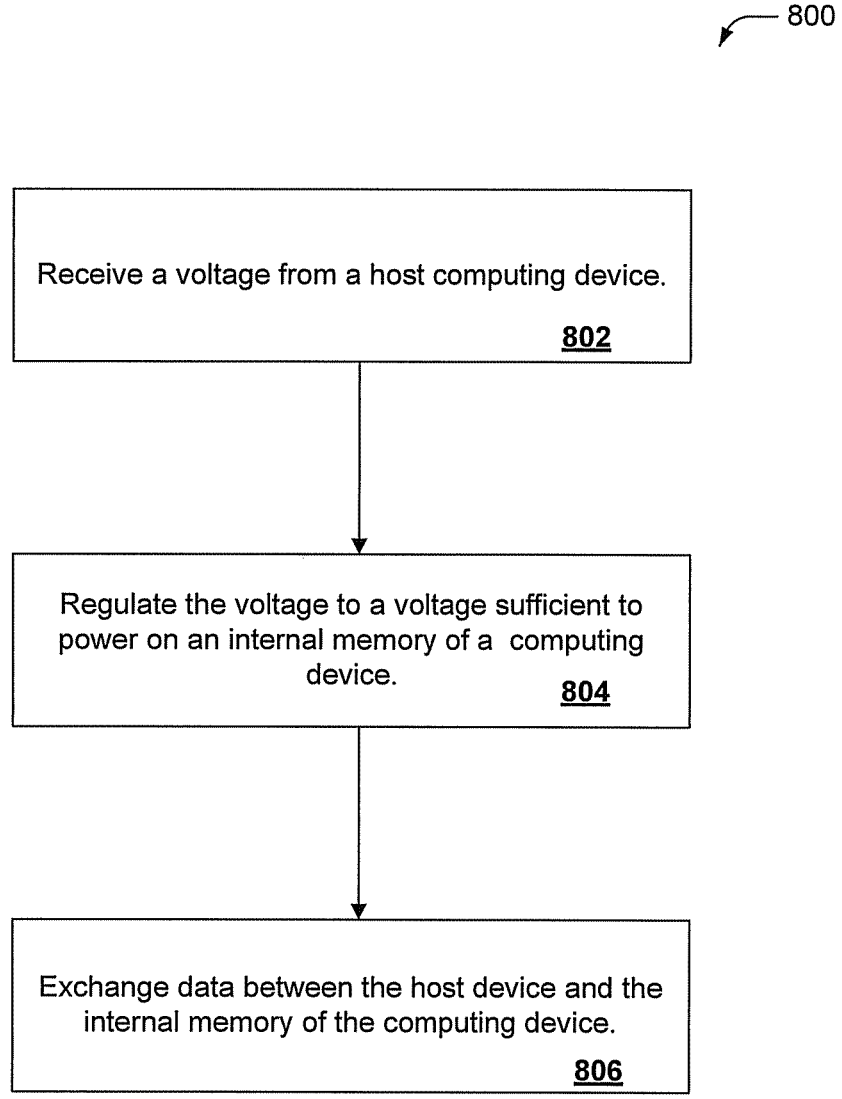
FIG. 8 is a schematic process flow diagram of a method for regulating a voltage to an internal memory of a portable computing device, according to an implementation of the subject disclosure.

Referring now to FIG. 8, illustrated is a method 800 for regulating a voltage to an internal memory of a computing device, according to an implementation of the subject disclosure. At 802, a voltage is received from a host computing device. The voltage is received across a connection through an interface. At element 804, the voltage received from the host computing device is regulated to a voltage sufficient to power on an internal memory of a computing device. At 806, data is exchanged between the host device and the internal memory of the computing device.

In an example, the host computing device supplies a voltage of 5V to the computing device through the connection. The voltage of 5V is greater than the voltage Vcc required to power on the internal memory of the computing device. The computing device can regulate the 5V voltage down to Vcc, the voltage required to power on the internal memory of the computing device.

Figure 9:
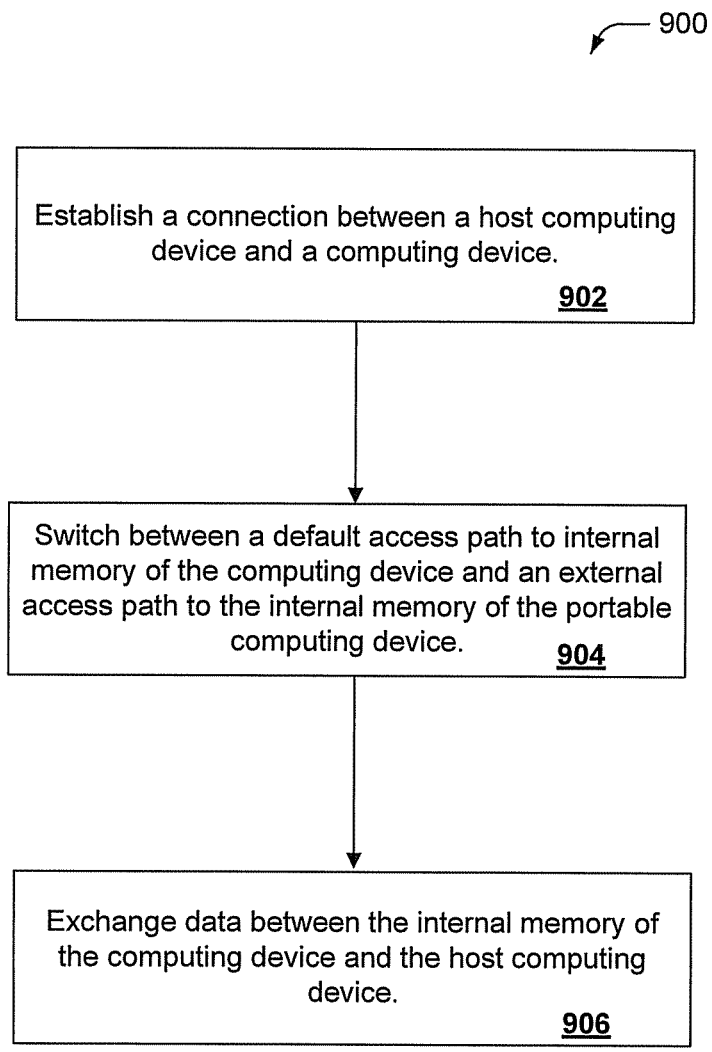
FIG. 9 is a schematic process flow diagram of a method for exchanging data between internal memory of a portable computing device and a host computing device, according to an implementation of the subject disclosure.

Referring now to FIG. 9, illustrated is a method 900 for exchanging data between internal memory of a computing device and a host computing device, according to an implementation of the subject disclosure. At element 902, a connection is established between the host computing device and the computing device. At 904, the computing device can switch between a default access path to internal memory and an external access path to the internal memory of the computing device. The default access path to internal memory is an internal access path used when the computing path is in active mode. The external access path can be used when the computing device is in the inactive state. At element 906, data can be exchanged between the internal memory and the host computing device.

The above description of illustrated embodiments, including what is described in the Abstract, is not intended to be exhaustive or to limit the disclosed implementations to the precise forms disclosed. While specific implementations and examples are described herein for illustrative purposes, various modifications are possible that are considered within the scope of such embodiments and examples, as those skilled in the relevant art can recognize.

As used herein, the word "example" is used to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the subject matter has been described in connection with various implementations and corresponding Figures, where applicable, it is to be understood that other similar implementations can be used or modifications and additions can be made to the described implementations for performing the same, similar, alternative, or substitute function of the disclosed subject matter without deviating therefrom. Therefore, the disclosed subject matter should not be limited to any single implementation or example described herein, but rather should be construed in breadth and scope in accordance with the appended claims.

What is claimed is:

1. A first computing device, comprising:
   an interface to facilitate establishment of a connection between a second computing device and an internal memory of the first computing device;
   a first voltage regulator to regulate a voltage received from the second computing device to a regulated voltage to power the internal memory of the first computing device;
   a controller to facilitate an exchange of data between the second computing device and the internal memory of the first computing device;
   an internal power source;
   a second voltage regulator to regulate a voltage received from the internal power source to a regulated voltage to power the internal memory of the first computing device; and
   a switch to switch between use of the second voltage regulator when the first computing device is in an active state, and use of the first voltage regulator when the first computing device is in an inactive state and the interface is connected to the second computing device.

2. The first computing device of claim 1, wherein the controller is to send a message through the connection to facilitate mounting the internal memory of the first computing device to a file system of the second computing device.

3. The first computing device of claim 1, wherein the interface is to facilitate the establishment of the connection when the first computing device is in the inactive state, the inactive state comprising one of a switched off state, a state in which the first computing device is unable to enter a switched on state, or a state in which the first computing device is unable to boot an operating system.

4. The first computing device of claim 1, wherein the interface is a Universal Serial Bus interface or a wireless interface.

5. The first computing device of claim 1, wherein the internal memory of the first computing device is a hard disk drive or a solid state drive.

6. The first computing device of claim 1, wherein the internal power source is to not supply power to the internal memory while the first computing device is in the inactive state,
   wherein the regulated voltage from the first voltage regulator instead of the internal power source is to power the internal memory while the first computing device is in the inactive state.

7. The first computing device of claim 1, further comprising logic to:
   send a first identification message to the second computing device in response to the first computing device being in the active state, the first identification message indicating to the second computing device that the second computing device is connected to the first computing device; and
   send a second identification message to the second computing device in response to the first computing device being in the inactive state, the second identification message indicating to the second computing device that the second computing device is connected to the internal memory.

8. The first computing device of claim 6, wherein the inactive state is a power off state of the first computing device.

9. A first computing device, comprising:
   an internal memory;
   an interface to establish a connection between the internal memory and a second computing device that is external of the first computing device;
   a first voltage regulator to convert a voltage supplied by the second computing device to a regulated voltage to power the internal memory, while the first computing device is in an inactive state;
   an internal power source;
   a second voltage regulator to regulate a voltage received from the internal power source to a regulated voltage to power the internal memory while the second computing device is in an active state; and
   a switch to switch between a default internal path to an external path utilized by the second computing device to access the internal memory through the interface, and the switch to switch between use of the second voltage regulator when the first computing device is in the active state, and use of the first voltage regulator when the first computing device is in the inactive state and the interface is connected to the second computing device.

10. The first computing device of claim 9, wherein the first computing device is a portable computing device.

11. The first computing device of claim 9, wherein the internal memory is a non-volatile memory.

12. The first computing device of claim 9, wherein the inactive state is a power off state of the first computing device.

13. The first computing device of claim 9, further comprising logic to:
   send a first identification message to the second computing device in response to the first computing device being in the active state, the first identification message indicating to the second computing device that the second computing device is connected to the first computing device; and
   send a second identification message to the second computing device in response to the first computing device being in the inactive state, the second identification message indicating to the second computing device that the second computing device is connected to the internal memory.

14. The first computing device of claim 11, wherein the non-volatile memory is a hard disk drive.

15. A method comprising:
   establishing a connection between a first computing device in an inactive state and a second computing device that is external of the first computing device;
   receiving power from the second computing device by the first computing device through the connection, the power received from the second computing device regulated by a first voltage regulator that outputs a regulated voltage that powers an internal memory of the first computing device in the inactive state;
   sending data of the internal memory of the first computing device to the second computing device through the connection when the first computing device is in the inactive state; and
   switching, by a switch, between use of the first voltage regulator when the first computing device is in the inactive state and use of a second voltage regulator when the first computing device is in an active state, the second voltage regulator receiving power from an internal power source of the first computing device and outputting a regulated voltage that powers the internal memory of the first computing device in the active state.

16. The method of claim 15, further comprising receiving, by the first computing device, data from the second computing device through the connection, and storing the received data in the internal memory of the first computing device.

17. The method of claim 15, wherein the receiving the power further comprises:

receiving, by the first computing device, a voltage from the second computing device; and regulating, by the first voltage regulator, the voltage from the second computing device to the regulated voltage output by the first voltage regulator that powers the internal memory of the first computing device.

18. The method of claim 15, further comprising switching between a default access path for the internal memory of the first computing device to an external connection access path upon establishing the connection.

19. The method of claim 15, wherein the inactive state is a powered off state.

20. The method of claim 15, wherein the inactive state is a state in which an operating system of the first computing device is inactive.

21. The method of claim 15, further comprising:

sending a first identification message to the second computing device in response to the first computing device being in the active state, the first identification message indicating to the second computing device that the second computing device is connected to the first computing device; and sending a second identification message to the second computing device in response to the first computing device being in the inactive state, the second identification message indicating to the second computing device that the second computing device is connected to the internal memory.

22. The method of claim 17, wherein the receiving the voltage comprises receiving a 5 V voltage from the second computing device.

* * * * *